May 15, 1934.     O. C. GILMORE     1,958,617
IMAGE TURNING ATTACHMENT FOR CAMERAS
Filed Jan. 25, 1932     3 Sheets-Sheet 1

Witness:
William P. Kilroy

Inventor:
Otto C. Gilmore
By John E. Gardner
Atty

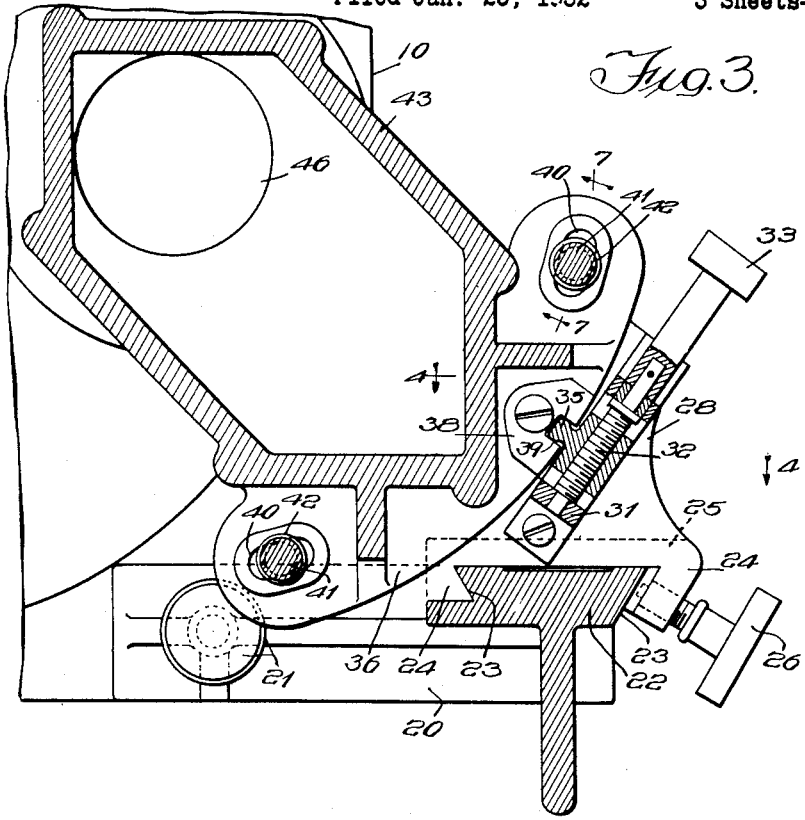

May 15, 1934.　　　O. C. GILMORE　　　1,958,617
IMAGE TURNING ATTACHMENT FOR CAMERAS
Filed Jan. 25, 1932　　3 Sheets-Sheet 3
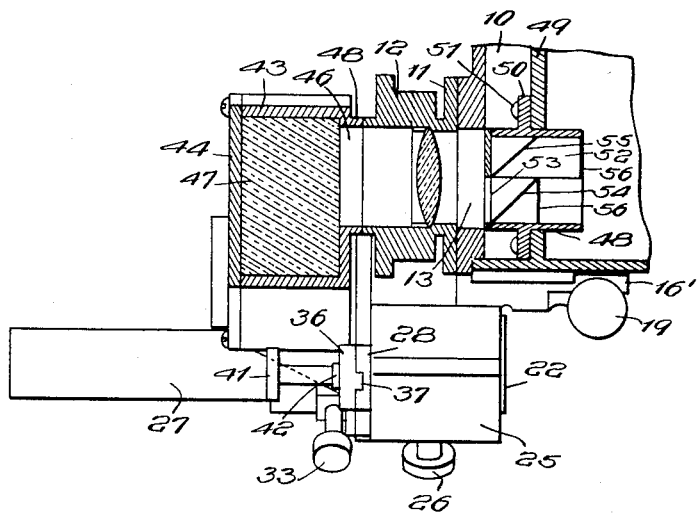
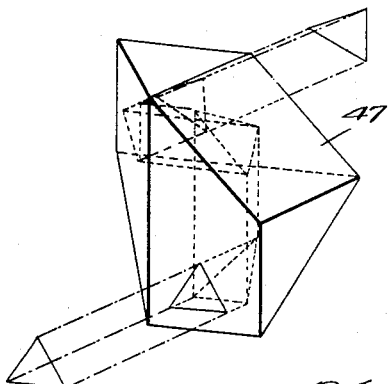
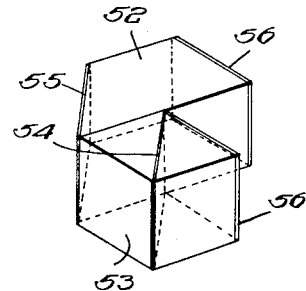
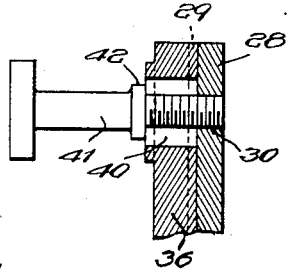
Witness:
William P. Kilroy
Inventor:
Otto C. Gilmore
John E. Gardner
Atty.

Patented May 15, 1934

1,958,617

UNITED STATES PATENT OFFICE 1,958,617

IMAGE TURNING ATTACHMENT FOR CAMERAS

Otto C. Gilmore, Los Angeles, Calif., assignor to Cinemacolor Corporation, Chicago, Ill., a corporation of Delaware Application January 25, 1932, Serial No. 588,654

8 Claims. (Cl. 88—1)

This invention relates to cameras, and is designed primarily to constitute an attachment whereby a standard camera may be converted from use in connection with the production of black and white positives for use in connection with the production of pictures in natural colors.

While the present invention is of general photographic use, it is primarily designed for use in conjunction with standard motion-picture cameras for the ultimate production of motion pictures in natural colors.

With the above and other objects in view, as will be apparent, this invention consists in the construction, combination and arrangement of parts all as hereinafter more fully described, claimed and illustrated in the accompanying drawings, wherein:

Fig. 3 is a vertical section taken along line 3—3 of Fig. 1, showing the interior of the prism mounting and the details of the mechanism for adjusting the angularity thereof, as well as the adjustment of the prism mechanism, relatively to the camera;

Fig. 4 is a horizontal section taken along line 4—4 of Fig. 2 to illustrate the details of the attachment to the camera and further details with regard to the adjustment of the angularity of the prism and its case;

Fig. 5 is a vertical section taken along line 5—5 of Fig. 4, and illustrates the structure for securing the attachment to the camera;

Fig. 6 is a general vertical section through the camera lens, the image-splitting prism and the turning prisms showing the co-operation between these elements;

Fig. 7 is a section taken along line 7—7 of Fig. 3 and illustrates the operation of one of the set screws fixing the adjustment of the angularity of the turning prism.

Fig. 8 is a perspective view of the turning prism used in the present invention; and Fig. 9 is a similar view of the light or image-splitting prism.

Figure 1:
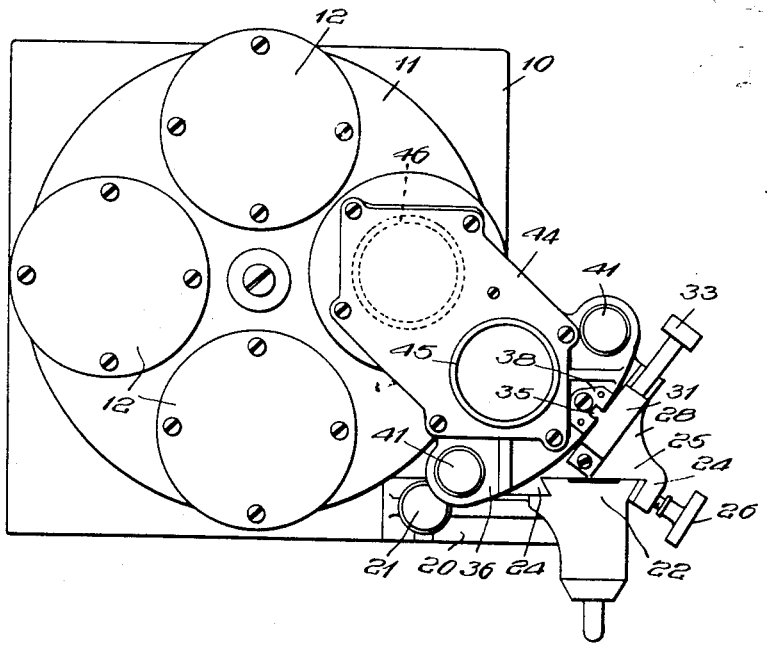
Fig. 1 is a front elevation of a motion-picture camera illustrating the present invention in conjunction therewith.
Figure 2:
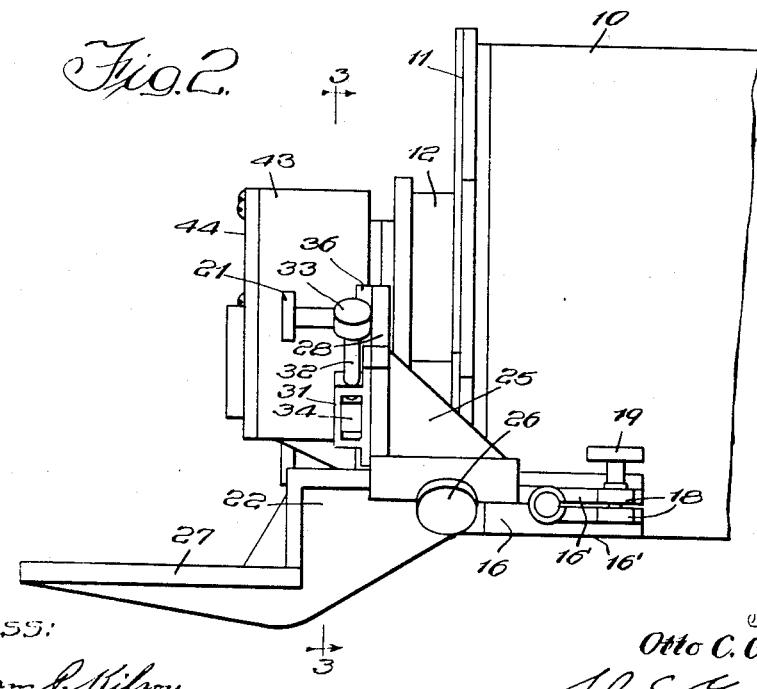
Fig. 2 is a side elevation of the lens end of a camera illustrating the present invention in conjunction therewith.

The present invention, while it is of general use, is primarily designed for the conversion of a standard motion-picture camera from the production of black and white to the production of complementary photographic color record from which positives may be made for the projection of motion pictures in natural colors. Fundamentally, the present invention is designed for use in carrying out the process of making motion pictures in natural colors which turns a single image upon its side, passing said image through a light-splitting prism to create two or more duplicate images resting them on their sides, i. e.—having the bottom of the image parallel to the side of the film, each image passing through an individual and separate color filter. In this manner the negative has two or more duplicate images positioned on their sides in the space normally occupied by a single black and white image, each of said images constituting a separate and distinct color record.

Heretofore in the production of motion pictures in natural colors it has been customary and usual to use specially constructed cameras for that purpose. The present invention is primarily designed as an attachment to the normal standard black and white camera in such manner that that camera may be readily converted to make a negative color record, as above described, by the use of the attachment, which may also be easily and readily removed when it is desired to make black and white pictures. Inasmuch as the present invention is confined to the construction of the attachment and does not relate to the process of making motion pictures or the projection thereof, nothing will be herein described except that which relates to the camera, and only such portions of the camera as coact directly with the present invention.

Reference being had more particularly to the drawings, 10 designates the case of a standard motion-picture camera, provided with the usual turret head rotatively mounted on the forward end thereof, and carrying the lens containers or barrels 12. The rotation of the turret 11 positions any one of the several lens containers or barrels 12 in alignment with the aperture 13 in the forward end of the camera case 10. In this manner any one of the several lens sets may be used.

The forward end of the camera case 10 adjoining the aperture 13 is provided with a dovetail projection 15, upon which is usually mounted the carrier or frame which supports matt boxes and outside iris.

The foregoing construction is standard in motion-picture cameras and forms no part of the present invention, being merely described to show in what manner the present invention coacts with the standard camera.

Coacting with the dovetail projection 15 is a bracket 16, including the spring arms 16', the inner surfaces of said arms being provided with complementary dovetail grooves 17, in which the dovetail projection 15 is received. Each of the arms 16' is provided with an outstanding ear 18, which may be compressed one toward the other by the use of a set screw 19. Thus the bracket 16 may be secured to the dovetail projection 15 by inserting the same into the dovetail grooves 17 of the arms 16', and can be held in that position by compressing said arms by the instrumentality of the set screw 19 to clamp and grip the projection 15. The forward end of the bracket 16 is provided with a lateral projection 20 that is adapted to rest against the forward face of the camera case 10 out of the path of the lens turret 11. This projection 20 is pierced at one end by a set screw 21, which enters into and engages a threaded aperture in the front plate of the camera case 10. Thus the bracket 16 may be removably but rigidly secured to one corner of the camera case 10 adjoining the aperture 13. This mounting of the bracket 16 upon the camera case is accomplished entirely by the use of elements, such as the projection 15, forming a part of the standard camera construction.

The forward end of the bracket 16 is provided with an offset extension 22, the longitudinal edges of which are bevelled for co-operation with the bevelled flanges 24 formed upon the sides of a turning prism carrier 25. In this manner the carrier 25 is slidably mounted upon the extension 22 of the bracket 16, and by that means may have its position adjusted and altered with respect to the lens turret 11. The carrier 25 is maintained in its adjusted position by means of a set screw 26 piercing one of the flanges 24 of the carrier and impinging against the adjoining bevelled edge 23 of the extension 22.

Beyond the extension 22 of the bracket 16 is a second extension 27 thereof offset downwardly therefrom, the same being provided for the mounting of a standard matt box and outside iris, and is a substitute for the similar element which the present attachment takes the place of.

The forward end of the carrier 25 is provided with a vertical transverse arcuate track 28, provided with a concentric groove 29 in the forward face thereof. The base of this groove 29, and adjoining the end 5 thereof, is provided with threaded apertures 30 (see Fig. 7). Adjoining the groove 29 in the track 28 is a housing 31 tangentially arranged with respect to the arc of the groove 29. A threaded shaft 32 is mounted for rotation within the housing 31, and is provided with manipulating handle 32 on the projecting end thereof. Mounted upon the threaded shaft 32 and being internally threaded for coaction therewith is a sleeve 34 which, as the shaft 32 is rotated, moves longitudinally in one direction or the other within the housing 31. This sleeve 34 is provided with an outstanding teat 35 which projects from the housing 31, and is thereby positioned adjoining the groove 29 in the track 28.

Co-operating with the track 28 is a plate 36 having a tongue 37 projecting into and operating within the groove 29 of the track 28. This plate is arcuate in form and rests flush against the face of the track 28. Adjoining one end of its outer surface is a projecting lug 38, in which is provided a recess 39. This recess 39 receives the projecting teat 35 of the sleeve 34. Thus it will be seen that as the shaft 32 is rotated and the sleeve 34 is moved thereby within the housing 31, the connection between the teat 35 of the sleeve 34 and the recess 39 of the projection 38 on the plate 36 will cause the plate to be correspondingly moved with reference to the track 28. In this manner the position of the plate 36 with reference to the track 28 may be adjusted.

In order to hold the plate 36 in its adjusted position with reference to the track 28, the plate is provided, at its ends, with the elongated apertures 40 in substantial registration with the groove 29 in the track, through which project set screws 41, operating in the threaded openings 30 adjoining the ends of the groove 29 in the track 28. These set screws 41 are provided with shoulders 42, which bear against and clamp the plate 36 when it is desired to hold the plate in its adjusted position. Manifestly, therefore, the position of the plate 36 upon the track—28 may be adjusted by releasing or loosening the set screws 41, and rotating the set screw 33 in the proper direction, as above described. When the adjustment has been accomplished, the set screws 41 may be tightened within the threaded openings 30 of the track 28, thereby bringing the projections 42 thereof into clamping relationship with the plate 36 to grip the same and hold it in its proper position.

The turning prism, which is designed to turn the image through 90° so that it enters the camera resting upon its side, is carried by the plate 36 within the casing 43 fixed centrally to the plate 36 and projecting upwardly therefrom at a point between the elongated apertures 40 therein. This casing 43 is provided with a removable cover 44, by which access may be had to the casing for the insertion of the prism. The end of the cover 44 adjoining the plate 36 is provided with an aperture 45, by means of which light enters the casing 43 to be acted upon by the prism. The bottom of the casing 43 is provided with a similar opening 46 in the end thereof, remote from the plate 36, by means of which light may pass from the casing 43. This opening 46 of the casing 43 is aligned directly with the lens barrel 12 positioned in co-operative relation with the aperture 13 of the camera case 10. The light from the object enters the casing 43 through the opening 45, and within the casing 43 is acted upon by the prism 47 illustrated in Fig. 8. This prism reflects light to and through the opening 46, and in so doing turns the image through 90°. In passing from the casing 43 through the opening 46, the light is acted upon by the lens set within the co-operating barrel 12 and is directed thereby into the camera.

The adjustments heretofore described of the carrier 25 and the plate 36 are such that the prism casing 43 may be moved away from the turret 11 so that it may be freely manipulated and may be positioned directly against the outer terminal of any one of the lens barrels 12 positioned in co-operation with the aperture 13 of the camera case 10.

To overcome any leakage between the casing 43 and the outer end of the co-acting lens barrel, the former is provided with a flange 48 about the opening 46, which is designed to contact with and abut against the outer end of the coacting lens barrel 12. The adjustment of the plate 36 with reference to the track 28 causes a simultaneous adjustment of the casing 43 and the prism 47 therein contained with reference to the axis of the lens within the co-acting lens barrel 12. This insures the accurate positioning of the images upon the film within the camera.

From the foregoing it is manifest that utilizing the facilities present in the standard camera case an attachment is adjustably mounted thereon, which will deliver an image to and through the lens set, turned through 90° and resting upon its side.

In order to split the single light path entering the camera case 10 through the aperture 13, an image splitting device 48 is mounted within the opening of the gate 49 and is positioned between the film gate and the front wall of the camera case 10. This image splitting device 48 comprises a shell having an outstanding flange 50 which is secured to the body of the camera gate by means of the screws 51, which in most instances enter and engage threaded apertures usually provided in the camera gate 49. Within the shell of the image splitting device is a splitting prism 52, illustrated in Fig. 9. The light enters the prism through the transmitting surface 52 and contacts with the transmitting-reflecting surface 54. Part of the light is transmitted by the transmitting-reflecting surface 54 directly into the camera, while the remainder is reflected by the surface 54 at right angles to the full reflecting surface 55. This full reflecting surface 55 again bends the light at right angles and directs it into a camera in a path substantially paralleling a path transmitted by the surface 54. In this manner two substantially parallel light paths are created and directed into the camera. Each of these light paths passes through appropriate color filters 55—56, which are illustrated as being in contact with the final transmitting surfaces of the prism. In practice these filters may be placed at any point in the light paths where the construction of a standard camera will permit.

From the foregoing, it is manifest that the present attachment may be removably secured to a standard motion picture camera without any material change in the construction, so that the camera may be readily and quickly converted for the production of complementary color records for the ultimate production of motion pictures in natural color.

It is furthermore manifest that this attachment may be quickly and readily removed so that the camera may be again used for the production of black and white pictures.

What is claimed is:

1. The combination with a standard motion picture camera having a lens set coacting with an opening in the camera case, and a dovetail projection, of a bracket, spring arms on said bracket provided with complementary dovetail grooves in the inner faces thereof to engage and grip the dovetail projection, ears projecting from said arms, a set screw coacting with said ears, an offset extension at the outer end of said bracket, having the edges thereof beveled, a carrier slidably mounted on said extension, beveled flanges at the sides of said carrier cooperating with the similarly formed edges of the bracket extension, a set screw piercing one of said flanges to impinge against the adjoining edge of the extension, an arcuate track mounted on said carrier, having a concentric groove therein, each end of said groove being provided with a threaded opening in the base thereof, a plate mounted for movement on said track with elongated apertures near the ends thereof, a tongue on said plate operating in the groove of said track, set screws in the apertures of the plate and operating in the threaded openings of the groove base, each screw being shouldered to bear against the outer face of the plate when clamping it in its adjusted position, a recessed projection on said plate, a housing on the track adjoining the plate, a threaded shaft rotably mounted in said housing, a sleeve mounted on said shaft for reciprocation in the housing upon the rotation of the shaft, a teat formed on the sleeve and extending into the recess of the projection on the plate, a prism casing mounted on the plate and extending to a point in alignment with the lens set where the bottom of the casing has a light aperture, a cover for said casing having a light aperture at the opposite end of the casing to the opening in the bottom thereof, a turning prism in the casing to receive light from the aperture in the cover and reflect it to and through the aperture in the bottom of the casing delivering it to the lens set and simultaneously turning it through 90°, a light splitting device in the camera to receive the light discharged from the aperture in the bottom of the casing and create a plurality of substantially parallel light paths, and complementary color filters in the light paths so created.

2. The combination with a standard motion picture camera having an opening in the wall thereof and a lens set coacting therewith, of a bracket removably attached to the wall of said camera, an offset extension at the outer end of said bracket having the edges thereof beveled, a carrier slidably mounted on said extension, beveled flanges at the sides of said carrier cooperating with the similarly formed edges of the bracket extension, a set screw piercing one of said flanges to impinge aganist the adjoining edge of the extension, an arcuate track mounted on said carrier, having a concentric groove therein, each end of said groove being provided with a threaded opening in the base thereof a plate mounted for movement on said track with elongated apertures near the ends thereof, a tongue on said plate operating in the groove of said track, set screws in the apertures of the plate and operating in the threaded openings of the groove base, each screw being shouldered to bear against the outer face of the plate when clamping it in its adjusted position, a recessed projection on said plate, a housing on the track adjoining the plate, a threaded shaft rotatably mounted in said housing, a sleeve mounted on said shaft for reciprocation in the housing upon the rotation of the shaft a teat formed on the sleeve and extending into the recess of the projection on the plate, a prism casing mounted on the plate and extending to a point in alignment with the lens set where the bottom of the casing has a light aperture, a cover for said casing having a light aperture at the opposite end of the casing to the opening in the bottom thereof, a turning prism in the casing to receive light from the aperture in the cover and reflect it to and through the aperture in the bottom of the casing delivering it to the lens set and simultaneously turning it through 90°, a light splitting device in the camera to receive the light discharged from the aperture in the bottom of the casing and create a plurality of substantially parallel light paths, and complementary color filters in the light paths so created.

3. The combination with a standard motion picture camera having an aperture in the wall thereof and a lens set coacting therewith, of a bracket removably secured to the camera, an extension on said bracket, a carrier adjustably mounted on said extension, an arcuate track mounted on said carrier, having a concentric groove therein, each end of said groove being provided with a threaded opening in the base thereof, a plate mounted for movement on said track with elongated apertures near the ends thereof, a tongue on said plate operating in the groove of said track, set screws in the apertures of the plate and operating in the threaded openings of the groove base, each screw being shouldered to bear against the outer face of the plate when clamping it in its adjusted position, a recessed projection on said plate, a housing on the track adjoining the plate, a threaded shaft rotatably mounted in said housing, a sleeve mounted on said shaft for reciprocation in the housing upon the rotation of the shaft, a teat formed on the sleeve and extending into the recess of the projection on the plate, a prism casing mounted on the plate and extending to a point in alignment with the lens set where the bottom of the casing has a light aperture, a cover for said casing having a light aperture at the opposite end of the casing to the opening in the bottom thereof, a turning prism in the casing to receive light from the aperture in the cover and reflect it to and through the aperture in the bottom of the casing delivering it to the lens set and simultaneously turning it through 90°, a light splitting device in the camera to receive the light discharged from the aperture in the bottom of the casing and create a plurality of substantially parallel light paths, and complementary color filters in the light paths so created.

4. The combination with a standard motion picture camera including a lens set, of a bracket removably cooperating with said camera, a carrier adjustably mounted on said bracket, an arcuate track mounted on said carrier, having a concentric groove therein, each end of said groove being provided with a threaded opening in the base thereof, a plate mounted for movement on said track with elongated apertures near the ends thereof, a tongue on said plate operating in the groove of said track, set screws in the apertures of the plate and operating in the threaded openings of the groove base, each screw being shouldered to bear against the outer face of the plate when clamping it in its adjusted position, a recessed projection on said plate, a housing on the track adjoining the plate, a threaded shaft rotatably mounted in said housing, a sleeve mounted on said shaft for reciprocation in the housing upon the rotation of the shaft, a teat formed on the sleeve and extending into the recess of the projection on the plate, a prism casing mounted on the plate and extending to a point in alignment with the lens set where the bottom of the casing has a light aperture, a cover for said casing having a light aperture at the opposite end of the casing to the opening in the bottom thereof, a turning prism in the casing to receive light from the aperture in the cover and reflect it to and through the aperture in the bottom of the casing delivering it to the lens set and simultaneously turning it through 90°, a light splitting device in the camera to receive the light discharged from the aperture in the bottom of the casing and create a plurality of substantially parallel light paths, and complementary color filters in the light paths so created.

5. The combination with a motion picture camera including a lens set, of a carrier removably and adjustably cooperating with said camera, an arcuate track mounted on said carrier, having a concentric groove therein, each end of said groove being provided with a threaded opening in the base thereof, a plate mounted for movement on said track with elongated apertures near the ends thereof, a tongue on said plate operating in the groove of said track, set screws in the the apertures of the plate and operating in the threaded openings of the groove base, each screw being shouldered to bear against the outer face of the plate when clamping it in its adjusted position, a recessed projection on said plate, a housing on the track adjoining the plate, a threaded shaft rotatably mounted in said housing, a sleeve mounted on said shaft for reciprocation in the housing upon the rotation of the shaft, a teat formed on the sleeve and extending into the recess of the projection on the plate, a prism casing mounted on the plate and extending to a point in alignment with the lens set where the bottom of the casing has a light aperture, a cover for said casing having a light aperture at the opposite end of the casing to the opening in the bottom thereof, a turning prism in the casing, to receive light from the aperture in the cover and reflect it to and through the aperture in the bottom of the casing delivering it to the lens set and simultaneously turning it through 90°, a light splitting device in the camera to receive the light discharged from the aperture in the bottom of the casing and create a plurality of substantially parallel light paths, and complementary color filters in the light paths so created.

6. The combination with a camera including a lens set of a carrier removably and adjustably cooperating with said camera, a track on said carrier, a plate adjustably coacting with said track, a prism casing mounted on the plate and extending to a point in alignment with the lens set where the bottom of the casing has a light aperture, a cover for said casing having a light aperture at the opposite end of the casing to the opening in the bottom thereof, a turning prism in the casing to receive light from the aperture in the cover and reflect it to and through the aperture in the bottom of the casing delivering it to the lens set and simultaneously turning it through 90°, a light splitting device in the camera to receive the light discharged from the aperture in the bottom of the casing and create a plurality of substantially parallel light paths, and complementary color filters in the light paths so created.

7. The combination with a camera including a lens set, of a carrier removably and adjustably cooperating with said camera, a plate adjustably mounted on said carrier, a prism casing mounted on the plate and extending to a point in alignment with the lens set where the bottom of the casing has a light aperture, a cover for said casing having a light aperture at the opposite end of the casing to the opening in the bottom thereof, a turning prism in the casing to receive light from the aperture in the cover and reflect it to and through the aperture in the bottom of the casing delivering it to the lens set and simultaneously turning it through 90°, a light splitting device in the camera to receive the light discharged from the aperture in the bottom of the casing and create a plurality of substantially parallel light paths, and complementary color filters in the light paths so created.

8. The combination with a camera, including a lens set of a carrier removably and adjustably cooperating with said camera, a casing adjustably mounted on said carrier, and extending to a point in alignment with the lens set where the bottom of the casing has a light aperture, a cover for said casing having a light aperture at the opposite end of the casing to the opening in the bottom thereof, a turning prism in the casing to receive light from the aperture in the cover and reflect it to and through the aperture in the bottom of the casing delivering it to the lens set and simultaneously turning it through 90°, a light splitting device in the camera to receive the light discharged from the aperture in the bottom of the casing and create a plurality of substantially parallel light paths, and complementary color filters in the light paths so created.

OTTO C. GILMORE.